US011863802B2

(12) United States Patent
Allen et al.

(10) Patent No.: US 11,863,802 B2
(45) Date of Patent: *Jan. 2, 2024

(54) SYSTEMS AND METHODS FOR EXTRATERRESTRIAL STREAMING (71) Applicant: Infrared5, Inc., Jamaica Plain, MA (US)

(72) Inventors: Chris Allen, Jamaica Plain, MA (US); Davide Lucchi, Boston, MA (US)

(73) Assignee: Infrared5, Inc., Jamaica Plain, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/929,372

(22) Filed: Sep. 2, 2022

(65) Prior Publication Data

US 2023/0147690 A1    May 11, 2023

Related U.S. Application Data (63) Continuation of application No. 16/912,926, filed on Jun. 26, 2020, now Pat. No. 11,438,638.

(Continued)

(51) Int. Cl.
*H04N 21/2187* (2011.01)
*H04N 21/4788* (2011.01)
(Continued)

(52) U.S. Cl.
CPC ....... *H04N 21/2187* (2013.01); *H04L 65/612* (2022.05); *H04L 65/80* (2013.01);
(Continued)

(58) Field of Classification Search
CPC ........... H04N 21/2187; H04N 21/4788; H04N 21/21805; H04N 21/6125; H04L 65/4084; H04L 65/80; H04L 65/4092
See application file for complete search history.

(56) References Cited

U.S. PATENT DOCUMENTS 6,598,074 B1    7/2003    Moller et al.
6,864,835 B1    3/2005    Taur et al.
(Continued)

FOREIGN PATENT DOCUMENTS

DE    10 2013 010 801 A1    12/2014
DE    10 2015 204 463 A1    9/2016
(Continued)

OTHER PUBLICATIONS

U.S. Patent and Trademark Office, "International Search Report and Written Opinion Received", International Application No. PCT/US2020/039750, dated Oct. 8, 2020, 20 Pages.

(Continued)

*Primary Examiner* — Alazar Tilahun
(74) *Attorney, Agent, or Firm* — Patent GC LLC (57) ABSTRACT A network of orbiting satellites can be used with a distributed network of nodes to deliver live video streams from physical locations in space to Earth for distribution to viewers on client devices. The approach can include replicating a distributed network cluster in space where each orbiting satellite is a node in the network. This system allows entities to deliver low latency live video streams from cameras mounted on the spacecraft, as well as other satellites, and on the surface of the Moon and planets. The latency will depend on the communication technology used and the distance of the video source from Earth. The lowest latency can be achieved by using optical communication technology, such as laser communication. The system can distribute live streams originating in space to a large global audience through an earth-based distribution network and can support millions of concurrent online users with near real-time latency.

20 Claims, 7 Drawing Sheets

Related U.S. Application Data (60) Provisional application No. 62/877,075, filed on Jul. 22, 2019, provisional application No. 62/867,387, filed on Jun. 27, 2019.

(51) Int. Cl.
    *H04N 21/61*     (2011.01)
    *H04N 21/218*     (2011.01)
    *H04L 29/06*     (2006.01)
    *H04L 65/80*     (2022.01)
    *H04L 65/612*     (2022.01)

(52) U.S. Cl.
    CPC ... *H04N 21/21805* (2013.01); *H04N 21/4788* (2013.01); *H04N 21/6125* (2013.01)

(56) References Cited

U.S. PATENT DOCUMENTS

| | | | |
|---|---|---|---|
| 7,492,749 B2 | 2/2009 | Song et al. | |
| 8,274,563 B1 | 9/2012 | Bunch | |
| 9,843,388 B1* | 12/2017 | Astakhov | H04B 10/503 |
| 10,075,678 B2 | 9/2018 | Kadari et al. | |
| 10,313,408 B2* | 6/2019 | Phillips | H04L 67/5681 |
| 11,438,638 B2 | 9/2022 | Allen | |
| 2009/0201988 A1* | 8/2009 | Gazier | H04N 19/40 |
| | | | 375/240.06 |
| 2012/0198041 A1* | 8/2012 | Black | H04N 21/47202 |
| | | | 709/223 |
| 2014/0300737 A1 | 10/2014 | Lust et al. | |
| 2015/0012656 A1* | 1/2015 | Phillips | H04L 47/70 |
| | | | 709/226 |
| 2015/0081847 A1* | 3/2015 | Hao | H04L 65/762 |
| | | | 709/219 |
| 2016/0099770 A1* | 4/2016 | Glottmann | H04B 7/18532 |
| | | | 370/316 |
| 2017/0012698 A1* | 1/2017 | Laufer | H04B 7/18536 |
| 2018/0054766 A1* | 2/2018 | Wittenschlaeger | H04W 36/18 |
| 2019/0028465 A1* | 1/2019 | Allen | H04L 61/256 |
| 2020/0413107 A1 | 12/2020 | Allen et al. | |

FOREIGN PATENT DOCUMENTS

| | | |
|---|---|---|
| EP | 2 072 401 B1 | 10/2011 |
| WO | 2020/264251 A1 | 12/2020 |

OTHER PUBLICATIONS

U.S. Patent and Trademark Office, "Non-Final Office Action Received", U.S. Appl. No. 16/912,926, filed Sep. 2, 2021, 47 Pages.
U.S. Patent and Trademark Office, "Notice of Allowance Received", U.S. Appl. No. 16/912,926, filed May 11, 2022, 8 pages.
WIPO, "International Preliminary Report on Patentability", International Application No. PCT/US2020/039750, dated Jan. 6, 2022, 11 Pages.

* cited by examiner

800 - Node:
802 - Node Identifier
804 - Node Type: [Edge, Relay, Origin]
806 – Orbit information
        - position and orientation over time
        - range control

850 – Configuration:
852 – Window of Time
854 – Communication Pairs [O,R]; [R,E]

SYSTEMS AND METHODS FOR EXTRATERRESTRIAL STREAMING

CROSS-REFERENCE TO RELATED APPLICATIONS

This application is a nonprovisional patent application claiming priority to prior filed provisional patent application Ser. No. 62/877,075, filed Jul. 22, 2019, entitled "Systems and Methods for Extraterrestrial Streaming", which is hereby incorporated by reference.

This application also is a nonprovisional patent application claiming priority to prior filed provisional patent application Ser. No. 62/867,387, filed Jun. 27, 2019, entitled "Systems and Methods for Extraterrestrial Streaming", which is hereby incorporated by reference.

BACKGROUND

Space exploration began on Oct. 4, 1957, when the Soviets launched the first artificial satellite—the Sputnik 1—into space. Since then, many more satellites and spacecraft have been launched to gather data about space and study it. Thanks to the advancement in technology, spacecraft have been able to gather more and more data. One of the current challenges is to watch on Earth live streams that are broadcasted by far away space probes.

SUMMARY

This Summary introduces a selection of concepts in simplified form that are described further below in the Detailed Description. This Summary neither identifies features as key or essential, nor limits the scope of the claimed subject matter.

A network of distributed nodes is deployed in space, for example using satellites and space probes connected together through communication channels, such as laser-based communication and optionally radio channels as backup, to form a cluster to deliver live streams from a publisher in space to subscribers at other locations, such as on Earth or in spacecraft or other planetary objects. The cluster can be self-managed and is able to adapt as nodes move in space to provide correct operation during a window of time.

A cluster may be based on a centralized stream manager. A cluster may have decentralized stream management. A cluster with a stream manager typically is suitable for publishers and subscribers that are not too far from the stream manager, so that both publishers and subscribers can communicate with the stream manager with reasonably low latency. A cluster with decentralized stream management typically is suitable in any situation, especially with nodes that are far away from one another.

These cluster configurations, together with laser-based communication, allow delivery of live streams with very low latency, where the speed of light and distance between nodes are the primary factors affecting communication latency. This approach can be extended to transport any data in addition to or instead of live video streams. These features make the solution an effective means for scientists and companies in the space sector to better interact with space probes and acquire more knowledge about their surrounding environment.

In some implementations, a combination of encryption and authentication can be used to restrict access to certain live streams to authorized users.

In some implementations, the system can be used for automatic monitoring of status-level cameras, microphones, and other sensors, of spacecraft using computer image processing, audio processing, and other data processing. These streams may only be of interest to the ground crews and astronauts in cases where something has gone wrong, and the main intention of these devices is to monitor the conditions. In such an implementation, live video, audio, and other data of normal operation of monitored devices typically is not streamed down to Earth. Instead, these streams typically are monitored by processors on the spacecraft running image, audio, or data processing algorithms that detect when something has gone awry. In the case of a detected problem, the system then can alert a crew, or can stream the video/audio/data content through a network cluster. The system also can be configured to allow on-demand access to such live streams for delivery to anyone who wants to see it on demand.

Accordingly, in one aspect, a system for streaming data through space comprises at least one origin node configured to provide a stream of data, a plurality of relay nodes, and a plurality of edge nodes. Each edge node is configured to receive the stream of data from a relay node from among the plurality of relay nodes. Each relay node is configured to receive the stream of data from another node, selected from the at least one origin node or another relay node of the plurality of relay nodes, and transmit the stream of data to another node, selected from another relay node of the plurality of relay nodes or an edge node from among the at least one edge node. Each node of the at least one origin node and the plurality of relay nodes transmit the stream of data to the other node by communicating optically with the other node when sharing a line of sight with the other node. Each node of the plurality of relay nodes and the plurality of edge nodes receives the stream of data from the other node by communicating optically with the other node when sharing a line of sight with the other node.

In one aspect, a system for streaming data through space includes a node configured to transmit a stream of data and a plurality of edge nodes. Each edge node is configured to receive the stream of data. The node transmits the stream of data to a first edge node in the plurality of edge nodes by communicating optically with the first edge node when sharing a line of sight with the first edge node. The node transmits the stream of data to a second edge node of the plurality of edge nodes by communicating optically with the second edge node when sharing a line of sight with the second edge node. The node switches between transmitting to the first edge node and transmitting to the second edge node based on data indicative of the line of sight with the first edge node and the line of sight with the second edge node.

Any of the foregoing can include one or more of the following features. The system includes one or more data links connected to transmit the stream of data from at least one edge node of the plurality of edge nodes to a cluster of computers connected to the one or more data links. The cluster of computers receive the stream of data from the one or more data links and deliver the stream of data received from at least one edge node of the plurality of edge nodes to at least one subscriber computer.

Any of the foregoing can include one or more of the following features. Communicating optically comprises communicating using laser communication. A form of radio transmission may be used as a backup.

Any of the foregoing can include one or more of the following features. One or more nodes define a configuration of data transmission among the at least one origin node, the plurality of relay nodes, and the plurality of edge nodes to coordinate relaying the stream of data based on line of sight determined based on locations of the at least one origin node, the plurality of relay nodes, and the plurality of edge nodes. The configuration is switched to a new configuration when line of sight between two nodes is broken. The at least one origin node, the plurality of relay nodes, and the plurality of edge nodes are configured to coordinate determining the configuration based on locations of the at least one origin node, the plurality of relay nodes, and the plurality of edge nodes. The locations of the at least one origin node, the plurality of relay nodes, and the plurality of edge nodes are provided by data stored in a database shared among the at least one origin node, the plurality of relay nodes, and the plurality of edge nodes. A centralized stream manager determines the configuration of data transmission among the at least one origin node, the plurality of relay nodes, and the plurality of edge nodes, to coordinate relaying the stream of data, based on line of sight determined based on locations of the at least one origin node, the plurality of relay nodes, and the plurality of edge nodes. The locations of the at least one origin node, the plurality of relay nodes, and the plurality of edge nodes are provided by data stored in a database accessible to the centralized stream manager.

Any of the foregoing can include one or more of the following features. A transcoder node provides a first version of the stream of data having a first quality and a second version of the stream of data having a second quality different from the first quality. The first version has a first bandwidth utilization and the second version has a second bandwidth utilization different from the first bandwidth utilization.

Any of the foregoing can include one or more of the following features. One or more data links are connected to transmit the stream of data from at least one edge node of the plurality of edge nodes. A cluster of computers is connected to the one or more data links to receive the stream of data from the one or more data links and to deliver the stream of data received from at least one of the plurality of edge nodes to at least one subscriber computer.

Any of the foregoing can include one or more of the following features. An origin node comprises a spacecraft or a satellite. The origin node has an optical communication device. The origin node has a server computer installed on the spacecraft or satellite to manage streaming the stream of data over the optical communication device.

Any of the foregoing can include one or more of the following features. A relay node comprises a spacecraft or a satellite. The relay node has an optical communication device. The relay node has a server computer installed on the spacecraft or satellite to manage streaming the stream of data over the optical communication device.

Any of the foregoing can include one or more of the following features. An edge node comprises a spacecraft or a satellite. The edge node has an optical communication device. The edge node has a data link to a terrestrial computer cluster. The edge node has a server computer installed on the spacecraft or satellite to manage receiving the stream of data over the optical communication device and to manage streaming the stream of data over the data link to the terrestrial computer cluster. The edge node comprises a satellite in geostationary orbit.

Any of the foregoing can include one or more of the following features. A database stores locations of the at least one edge node, the plurality of relay nodes, and the plurality of edge nodes. A database stores locations of obstacles affecting line of sight between nodes. A configuration of the nodes for communication is based on their lines of sight and the locations of the obstacles. The obstacles comprise at least one of planetary objects, moon, spacecraft, satellites, or space debris, or any combination of these.

Any of the foregoing can include one or more of the following features. Line of sight laser technology can deliver streams with low latency. A management system, herein called a stream manager, can coordinate locations of satellites for relay of one or more of video, audio, and other data. Various real-time streaming protocols for transmission of video and audio over an internet connection, such as WebRTC, SRT, RTSP, QUIC, and others, can be leveraged to combine audio and video streams with synchronization between the two. A cluster of servers/satellites in an origin, relay, edge setup can deliver streaming data to an edge for transfer to a terrestrial delivery system. Such clusters also can identify line of sight obstructions and switch configurations to maintain constant audio/video delivery. Computer image, audio, and other data processing can be run on status level cameras, microphones, and other sensors and only stream data when requested. A transcoder node in the cluster, particularly at an origin, can allow for switching to lower or higher bandwidth. Recording capabilities for status level cameras, microphones, and sensors can be provided to enable rewinding back in the live stream to the point where a critical event occurred.

Any of the foregoing may be embodied as a computer system, as a component of such a computer system, as a process performed by such a computer system or a component of such a computer system, or as an article of manufacture including computer storage in which computer program code is stored and which, when processed by the processing system(s) of one or more computers, configures the processing system(s) of the one or more computers to provide such a computer system or a component of such a computer system.

The following Detailed Description references the accompanying drawings which form a part of this application, and which show, by way of illustration, specific example implementations. Other implementations may be made without departing from the scope of the disclosure.

DETAILED DESCRIPTION

Figure 1:
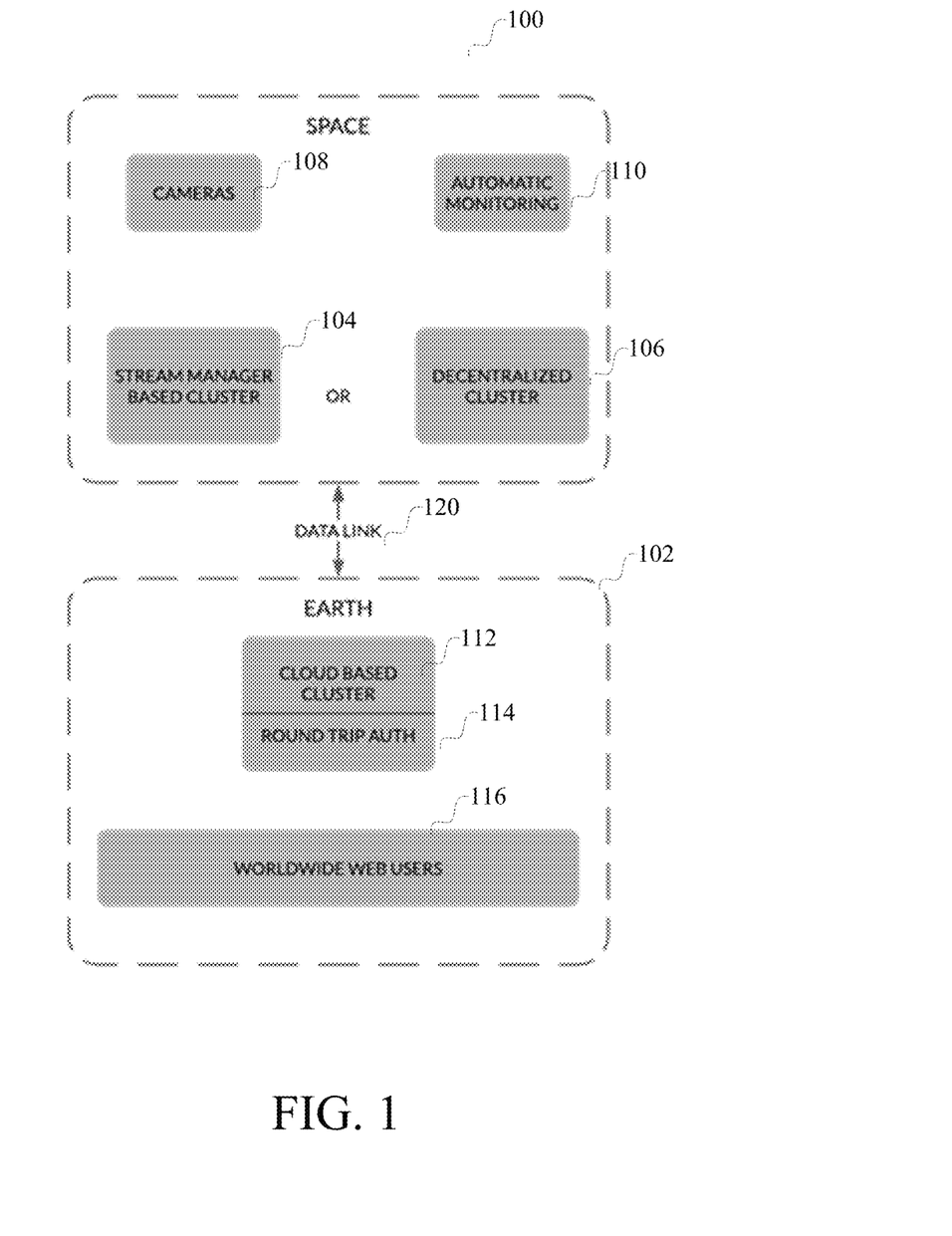
FIG. 1 is a block diagram of an example live video and audio streaming system.

A high-level block diagram of the overall system is shown in FIG. 1. The system can include a set of distributed nodes that can communicate and exchange data at high speed, and thus form a space cluster 100. Each node comprises a network server, which is a server computer or other computer system, deployed on a satellite or a space probe or other spacecraft. The spacecraft may have an orbit around an object such as the earth or moon or other planetary object or may have a trajectory in space.

Two different types of space clusters are shown in FIG. 1. One cluster 104 is managed by one or more centralized stream managers. In cluster 106, two or more decentralized distributed network servers can self-coordinate and manage the cluster 106 without stream managers. One or more clusters 104, or one or more clusters 106, or a combination of the two, can be used.

In the former scenario (cluster 104), a node in the cluster can act in one or more of at least four modes: an origin, relay, edge, or stream manager. In some implementations, each node can act in all four modes. The nodes are connected together such that origins are connected to relays which are connected to edges, while stream managers manage the cluster. Typically, for communication to earth-based subscribers, edges are deployed on satellites in a geostationary orbit around Earth, and origins are deployed in spacecrafts, ground base stations or satellites orbiting planets close to the broadcaster. Typically, relays may be, for example, in a geostationary orbit around Earth, or on the Moon, or on other planets, or on space crafts between the origins and edges.

Figure 2:
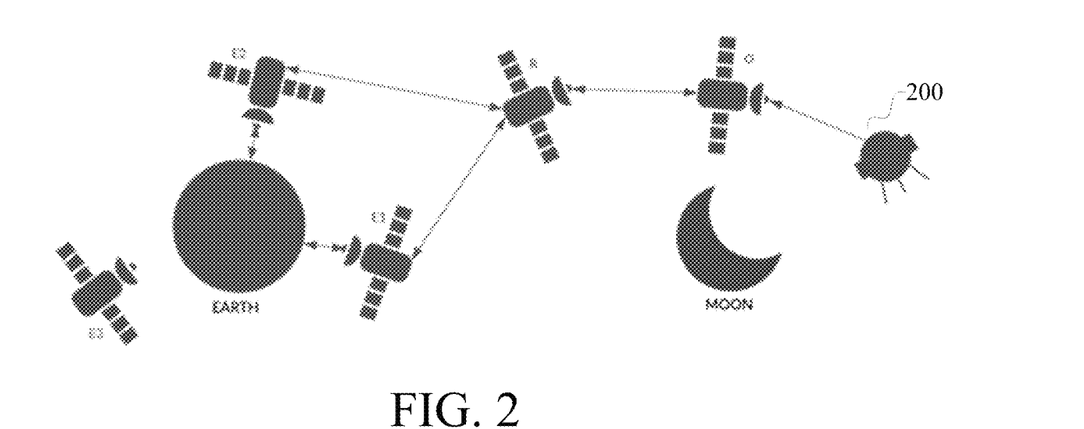
FIG. 2 is an illustration of an example of transmission of a live stream between a space probe orbiting the moon and Earth.

An example of this system is shown in FIG. 2. FIG. 2 illustrates an example of a live stream between a space probe (200) orbiting the Moon and Earth. The stream is broadcast to an origin (O) on the Moon's orbit, then to a relay (R) that may be available in another space probe between the Moon and Earth, and then to two edges (E1, E2) on Earth's orbit. The third edge (E3) is not used as it does not have line-of-sight with the relay (R). It should be understood that there can be any number of relays (R), and that a relay may transmit to one or more other relays, or one or more edges, or both. Having more relays allows for more complex routing of transmissions, such as to route transmission around obstructions. Using more relays also allows for reducing power consumption for transmissions over long distances by using multiple light-based links using less powerful lasers.

The stream manager is not shown in FIG. 2, but it may be deployed in the same orbit of the edge (E1, E2) or the relay (R). On the other hand, the stream manager may be either on a satellite orbiting the Earth or another location half-way between origins and relays and edges. The most efficient position, that is the position that provides the lowest latency in communication, depends on the expected number of broadcasting and subscribing clients. For example, for a live broadcast between the Moon and Earth it typically is best to use an origin on the Moon's orbit, a relay on a space probe between the Moon and Earth, and an edge on Earth's orbit. Regarding the stream manager, if the number of subscribers is expected to be more than the number of broadcasters then it typically is best to deploy the stream manager in Earth's orbit to reduce the connection time of the subscribing clients.

Origins, relays, and edges deliver live video streams between one another while the stream managers manage the cluster and provide line of sight between the nodes when an optical data link is used. Given that many servers are mounted on satellites that move during the day and year, the space cluster takes this into account and compensates for it by having stream managers replace existing nodes that lose line of sight with new ones that acquire line of sight. At the same time, stream managers are swapped in and out as well for the same reason. The result is an automated system that swaps nodes to provide a self-managed and operational cluster for a window of time.

Figure 8:
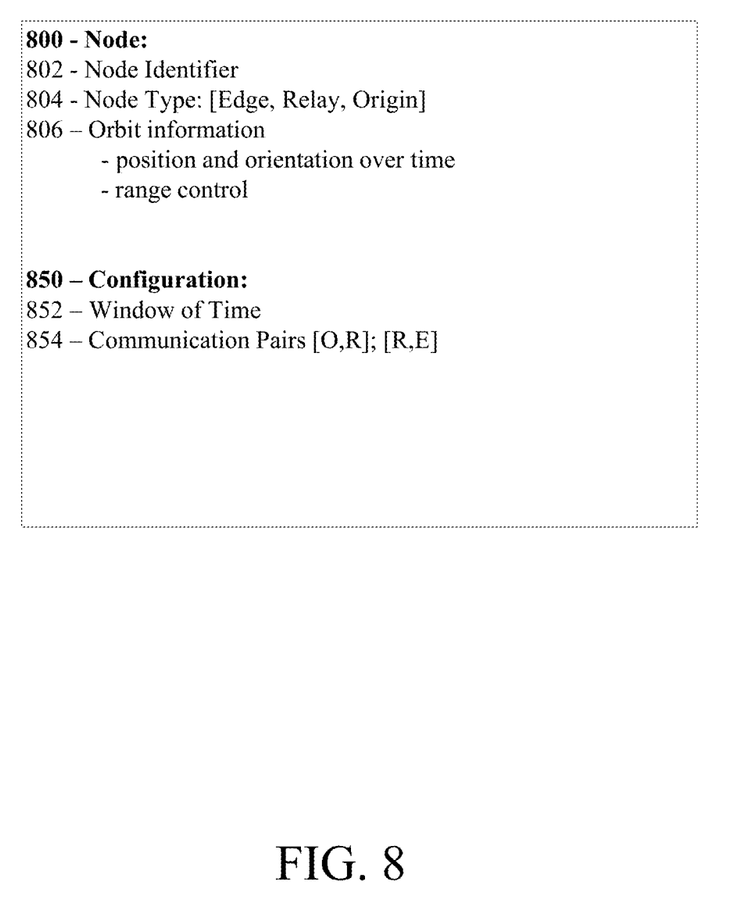
FIG. 8 illustrates an example implementation of a database used to track origin, edge, and relay nodes.

Turning now to FIG. 8, an example implementation of data structures that can be used for stream management, whether by a centralized stream manager or by nodes performing decentralized stream management, to maintain communication links within the cluster using a line of sight will now be explained. Such data structures can be stored in a variety of ways, such as in a shared database, or as in memory data structures, or in data files, or any combination of these. The following examples are not intended to be the sole implementations of such data structures but are merely illustrative of the kind of data the system uses. Typically, such data is initially generated, maintained, stored, and updated on Earth-based databases, which in turn are synchronized with data stored in the spacecraft and satellites forming the space cluster.

At least one data structure stores information about nodes, such as origins, relays, and edges. Typically, each origin, relay, or edge corresponds to a satellite, spacecraft or other moving object that is to become part of the cluster. Each node includes a computer system, typically implemented as a server computer, or server, as described in more detail below in connection with FIG. 9. The computer system is configured to store such data about nodes and to use such information as described herein to configure a cluster. In this example implementation, the stream manager, or decentralized stream management functionality, stores this information about nodes.

This example implementation of a node data structure 800 includes, for each node, an identifier 802 of the node and an indication of a type 804 of the node, such as whether the node is an origin, relay, or edge. The other information about a node is its orbit information. The orbit information allows the stream manager to determine whether a line of sight exists. The orbit information can be represented in a number of ways, such as a position and orientation of the satellite over time. Range control information (indicative of the range in which the satellite's orientation can be controlled to allow it to be oriented into a line of sight) also can be used. Other information (not shown) that may be used by a stream manager is any information indicative of obstacles to line of sight (e.g., the relative position of the moon or earth, or other known objects, such as space debris). Such other information can be obtained from databases maintained by various research institutions and governmental space agencies.

Using this information the stream manager can determine, for any given window of time, a configuration of the nodes that allows for line of sight transmission from an origin, through one or more relays, to an edge, during that period of time. This information can be stored as configuration information 850. For example, such configuration information can include data 852 indicating the window of time and data 854 indicating the pairs of nodes that are instructed to communicate with each other. In some implementations, the configuration information is used by satellite and spacecraft control systems to orient their receivers and transmitters to be in the desired line of sight based on their current and projected positions.

For a decentralized cluster 106, the configuration is similar to the one described above with the difference that there is no centralized stream manager. Instead, this cluster uses most of the concepts of a decentralized network. The determination of a configuration of nodes that allows for line of sight transmission between nodes can be implemented in the same way.

To determine a configuration for a given window of time, a computer system computes the paths from origin nodes to initial relay nodes, from the initial relay nodes to other relay nodes, and from relay nodes to edge nodes, in three dimensions. Given the information about obstacles, the computer system determines whether any of the known obstacles are likely to obstruct the paths during the window of time. The shortest path, or a sufficiently short path, of the remaining paths from origin nodes to edge nodes can be selected as the configuration for that window of time.

An example commercially available decentralized network is the Red5 Network available from Infrared5, Inc. This system is a decentralized system for real-time video streaming based on blockchain technology which uses resources provided by individual users, also referred as node owners, to deliver the streams through the network. Compensation can be provided to such node owners to encourage individual users to become part of the network and compensate them for the memory and bandwidth that they provide. Such compensation can be in the form of tokens on a blockchain which can be exchanged for currency. In some implementations, video streams can be encrypted. Further, a DRM (Digital Rights Management) key can be implemented to restrict access to, and enable decryption by, only those viewers with permission.

To have good performance and reduce end to end latency, a distributed network chooses nodes based on bandwidth, packet loss and geographical position when delivering a stream. This selection attempts to optimize performance and minimize latency by identifying the best combination of nodes under the current conditions. Due to this low latency, the distributed network is suitable to be used in situations that require live video interactivity like live auctions and interactive game shows. The details of such a network are discussed in U.S. Published Patent Applications 2019/0320004 and 2019/0320014, incorporated in its entirety by reference.

The nodes in the decentralized cluster can be origins, relays and edges and use a shared database to keep track of the current status of the network and to set up new connections between nodes. The database can be implemented using a blockchain. The setup of new connections can use an election process. A line of sight requirement can be enforced directly by nodes which will be able to determine the exact orbits of themselves and their neighbors through the data stored in the shared database and elect and replace nodes accordingly to maintain a usable cluster. Because such a decentralized cluster is not likely to include any malicious nodes, it does not require significant redundancy, complexity, and security.

The decentralized cluster is best used when nodes are far away from each other and their communication latency is in the range of minutes or hours, because it helps reduce the number of communications by not having a centralized stream manager. Since lunar missions will not have much distance and extra latency, the use of the decentralized cluster is not as advantageous as it would be for missions over a greater distance, as its performance over relatively short distances will be very similar to the one of the stream manager based clusters.

Referring back to FIG. 1, after a live stream has reached an edge (e.g., E1, E2, or E3, in FIG. 2) on Earth's orbit, it is then delivered to an earth-based cluster. In this example implementation, the earth-based cluster is a cloud-based cluster (112) that allows the live stream to be watched from anywhere in the Earth-based system (102) with low latency. The cloud-based cluster comprises a set of one or more stream managers, transcoders, origins, relays, and edges that are deployed in different regions to efficiently serve users anywhere on Earth, as will be described in more detail below in connection with FIGS. 3 and 4. Origins in the cloud-based cluster subscribe to an edge on Earth's orbit in the space cluster 100 to access a live stream through a data link 120, while users (116) on Earth use the stream manager to subscribe to an edge in the cloud to watch a stream. The data link can be, for example, an optical transmission link, such as a laser-based communication link, or a radio frequency based data link, or any other high-bandwidth communication medium conventionally used for earth-to-satellite communication.

Transcoders generate multiple bitrates for Adaptive Bit Rate (ABR) streaming, so that multiple versions of the same stream are available on the edges in the cloud-based cluster. Various techniques can be used to determine the capabilities and bandwidth available of each subscriber and supply them with the highest stream quality that they can handle. For example, in some implementations, the RTCP (the RTP control protocol of the Real-time Transport Protocol (RTP)) can be used to estimate capabilities and bandwidth. For example, in some implementations using WebRTC, edges can use the receiver estimated maximum bitrate (REMB) capability in the WebRTC protocol to estimate capabilities and bandwidth.

Such a system can be used to deliver many types of live streams. In some implementations, access to a live stream is limited to only authorized personnel. Such restricted access can be implemented, for example, using a Round Trip Authentication (RTA) system (114) in the cloud-based cluster. The RTA system validates a set of credentials provided by a user to determine if they are allowed to subscribe to a video stream or not. All transmissions of the data can be encrypted as well so as to ensure that access to the stream is only possible through authorized mechanisms. For example, 256-bit AES-CTR encryption can be enabled on all streams via datagram transport layer security (DTLS) and its related protocol called the secure real-time transport protocol (SRTP). As another example, the secure reliable transport (SRT) protocol can be used. As another example, the QUIC (Quick UDP Internet Connections) protocol, which provides multiplexed and secure form of stream transport. The roundtrip authentication process can be implemented to ensure that only those who should have access will have access to the streams.

In some implementations, the system can include status cameras 108 or microphones or both, or yet other sensors, which monitor hardware and other conditions of a spacecraft. Typically, such cameras, microphones, or other sensors operate continuously. A spacecraft may have many status cameras, microphones, or other sensors installed. One or more automatic monitoring systems 110 can be provided to process such data streams to monitor conditions in the spacecraft.

As an example of automatic monitoring, an image processing system typically processes feeds from the cameras and generates an alert when a change to a surface or system is detected. The feeds from status cameras can be processed locally on the spacecraft by a computer. In such an implementation, a live stream from a status camera can be initiated only when a change is detected. In this way, these streams would normally not be delivered to Earth. By not streaming all of this content, the amount of bandwidth used can be reduced. Additionally, an on-demand system can be provided to select a status camera and start and stop live streaming of a selected status camera from Earth at any time. Streams for status cameras can be run through a transcoder on the spacecraft to lower the video quality before being delivered to the space cluster and ultimately to Earth. Using a transcoder allows the system to set the quality of the stream based on the purpose for which the stream will be used. That is, if no alerts are generated or if the network is congested, a user may not need to watch a high-quality status camera video stream. On the other hand, in the presence of an alert, having a high-quality video stream may be vitally important to determine how to act.

Each of the nodes in the space cluster 100 generally is implemented as a server computer with a communication connection allowing communication with the other nodes in the cluster. The nodes communicate among themselves to exchange information and deliver the live streams. The communication link can be either optical or radio based. An optical link provides high capacity, and thus the possibility to deliver multiple streams in high resolution, but can involve a more precise tracking system, than tracking systems used for radio-based communication, to provide a line of sight between the servers. The optical link can be laser-based communication, such as laser communication relay demonstration (LCRD) developed by the National Aeronautics and Space Administration (NASA), which uses infrared lasers to transmit at 622 Mb/s from the moon, and receive 20 Mb/s from Earth. On the other hand, radio communication is easier to achieve but the channels have lower capacity and are shared with other entities. Therefore, to deliver high quality video streams, using an optical link for the communication between the instances and a radio-based link as backup is a particularly useful implementation.

Having provided an overview of such a system through FIGS. 1 and 2, further details will now be explained.

Given the large distances of space, with a relatively small number of satellites it is unlikely that a cluster with a single, fixed configuration can be used at any hour of the day for streaming data, since it is likely that lines of sight among all satellites cannot be maintained. Also, large distances cause high delays in communications. For example, if communication is happening at the speed of light then the Round Trip Time (RTT) between Earth and its Moon is on average around 2 to 3 seconds, while the RTT between Earth or Moon and Mars can be anywhere between 4 and 24 minutes. These conditions make common internet protocols, like TCP and UDP, not suitable for this application. Thus, other protocols that support real time streaming, such as WebRTC, SRT, RTSP, QUIC, and others, are preferable.

Ongoing research efforts have focused on Disruption-Tolerant Networking (DTN), which relates to networks that can tolerate high delays between transmission and reception of data and that do not assume a continuous end-to-end connection. In a DTN network if a destination cannot be found the data packets are not discarded but stored on the node where they arrived until they can be communicated with another node. This method is called store-and-forward. This method allows a distributed network space cluster to be used even if only some portions of it are working. For example, between Earth and a faraway space probe there can be a full cluster for a limited amount of time or none at all. In such applications, if the space probe has access to an origin node and a stream manager node (if used) then the space probe can live stream to the origin node. The origin stores the data for the stream if there is no relay node with which it has a line of sight. Then, after the origin has line-of-sight with a relay node, the origin can forward the stored live stream. This process continues until the stream reaches an edge node of the space-based cluster, which then transmits the data over the data link to the Earth's cloud-based cluster. In some cases, such a store and forward approach can be used.

While the distance from the Earth to the moon and back is relatively short, the system can be adapted for transmissions that are much farther away. When communicating over large distances, a sending node can send the data in the correct direction before a receiving node is there. That is, orbits can be predicted accurately and if, for example, the one-way trip time between node A and node B is 1 hour then node A can start sending data 1 hour before line-of-sight is established with node B. In this way, as soon as line-of-sight is established node B receives the packets from node A. A challenge in this solution is that the communication relies on correct positioning of the transmitter and receiver. Thus, their alignment is passive and based on calculations rather than an active tracking system which typically is not feasible because of the distances involved.

The stream managers are designed to be the brains of the space cluster. Stream managers manage the entire system controlling which servers among the available ones are configured together to stream content. Spacecrafts and satellites that host the servers are constantly moving along their orbits, and thus they will have line-of-sight only for a certain amount of time. This time can be predicted accurately by the stream managers. In other words, the communication paths used by the space cluster are dynamically defined with servers being swapped in and out automatically by stream managers as they start to lose or enter the line-of-sight. At the same time, the stream managers swap themselves in and out for the same reason. This is different from a cloud-based cluster on Earth where multiple stream managers are used for load balancing purposes. In the space cluster, having multiple stream managers ensures sustained operation of the cluster. In fact, the goal is to have a cluster that once established, is able to manage itself without user intervention for a certain window of time. Another advantage of multiple stream managers is that they can be used to lower the latency in communications. Taking FIG. 2 as an example, it is possible to deploy a stream manager close to the origin and another one close to the edges. This provides a low-latency interaction to both broadcasters and subscribers with the cluster.

In some implementations, when a cluster is up and running, the stream managers can provide a system in which: 1. There is always at least one stream manager available in the cluster, 2. Stream managers are swapped when they cannot be reached either by distributed servers or clients, 3. Servers in the cluster are swapped when they start losing line-of-sight, 4. Existing live streams are not interrupted if a server that is in use is swapped, and 5. Clients are switched to backup servers if there is a failure in a server that is in use.

A decentralized cluster is an alternative to a stream manager-based cluster. The main difference is that there are no stream managers in the network but instead nodes are able to coordinate between each other to setup and manage the cluster. The decentralized cluster and its working principles are similar to a cloud-based decentralized network, such as the Red5 Network as described U.S. Published Patent Applications 2019/0320004, 2019/0320014. In fact, the data of the nodes including their orbits are stored in a shared database and the connections between the nodes are generated through an election process. The election is based on a logistic regression model and a random sampling. The logistic regression model is used to filter-out nodes that are not suitable to be elected either because they do not have line of sight, they cannot provide a certain performance, or they are at risk to be overloaded. After a list of suitable nodes is created, a random node is picked for the election. Both nodes, elector and elected one, use the data available in the shared database to determine the orbit of the other node to calculate where to point their laser to establish a communication link.

Because there is not likely to be any malicious node, the election process can be limited to an interaction between two nodes, the elector and elected one, without any intervention of the broadcaster, because the system is run entirely by a single entity. This greatly improves the performance of the system. For instance, when a live stream is transmitted from Mars to Earth it takes at least six minutes to communicate to a broadcaster on Mars. On the other hand, an Earth based subscriber can communicate with an Earth orbiting Edge in less than 1 second round trip time. Therefore, if the publisher is not involved in the election process, the subscriber can elect an edge and watch a stream in just a few seconds. The outcome of the election then is stored in the shared database and eventually becomes available for the broadcaster as well.

A challenge of this approach is to keep the data in the shared database consistent when nodes are far apart from each other. This is a challenge because of the long distances involved that increase the latency of read and write operations to the database. A possible solution is to have multiple shared databases distributed all over the network that use a best effort policy to keep consistent data about the overall network while providing that the data about their local or nearby servers is always consistent. This solution can work because the election process only uses data from close-by nodes. For example, a subscriber uses consistent data about its nearby edges that access the exact same database while a publisher uses the same kind of data for the origins. The only real-time data used for an election is whether a node is online or not, as that can change over time, but that is not a problem in the situations mentioned above. On the other hand, no real-time data is used to determine if two nodes can have line of sight. That is because each node is in its same predictable orbiter trajectory, of which details are stored in the shared database, and thus each node's current position can be calculated accurately by any other node. For a relay election it is more complex to have consistent real-time data because a relay could be quite far from an edge. Thus, the edge may elect it before the relay has time to update its real-time data and have it propagated to the edge. This situation can be mitigated by planning ahead when a node will be offline, so the databases have time to update and by electing a backup relay. In this way, only in case of sudden malfunctions the edge-relay connection may fail, but in such instance the edge will connect to the backup relay to continue streaming. Considering that the relay and its backup are independent nodes they are unlikely to fail at the same time and this makes the network more reliable. Additionally, it is possible to elect a backup origin and edge and thus create a backup cluster that mirrors the main one.

Should a node in the main cluster fail, then existing clients are able to switch quickly to an already setup backup cluster to continue live streaming.

An earth-based cluster (cloud-based cluster 112 in FIG. 1) on Earth is a set of instances that include stream managers, origins, relays, and edges that is deployed on a cloud infrastructure. The cluster set up on earth can be implemented using technologies other than a cloud-based cluster (such as a set of servers provided by a service such as Amazon Web Services (AWS) or Microsoft Azure). A content delivery network (CDN), a decentralized network such as described herein, or other collection of server computers accessible over a computer network can be used. In the example of a cloud infrastructure, for example, such a deployment can be controlled by the content providers or can be provided as a service to content providers. The overall system includes a set of clusters that are deployed in different regions to serve traffic coming from anywhere on Earth while providing low latency in the video streams. Example implementations of such a system are described in U.S. Pat. Nos. 8,019,878, 8,024,469, 8,171,145, 8,166,181, and 8,019,867, and U.S. Published Patent Applications 2019/0320004, 2019/0320014, and 2019/0028465, all of which are hereby incorporated by reference. The principles of operation of such a system can be applied to the space-based cluster in combination with the determination of the configuration of the space-based cluster over time as described above to provide line of sight transmission between nodes during a window of time.

Figure 3:
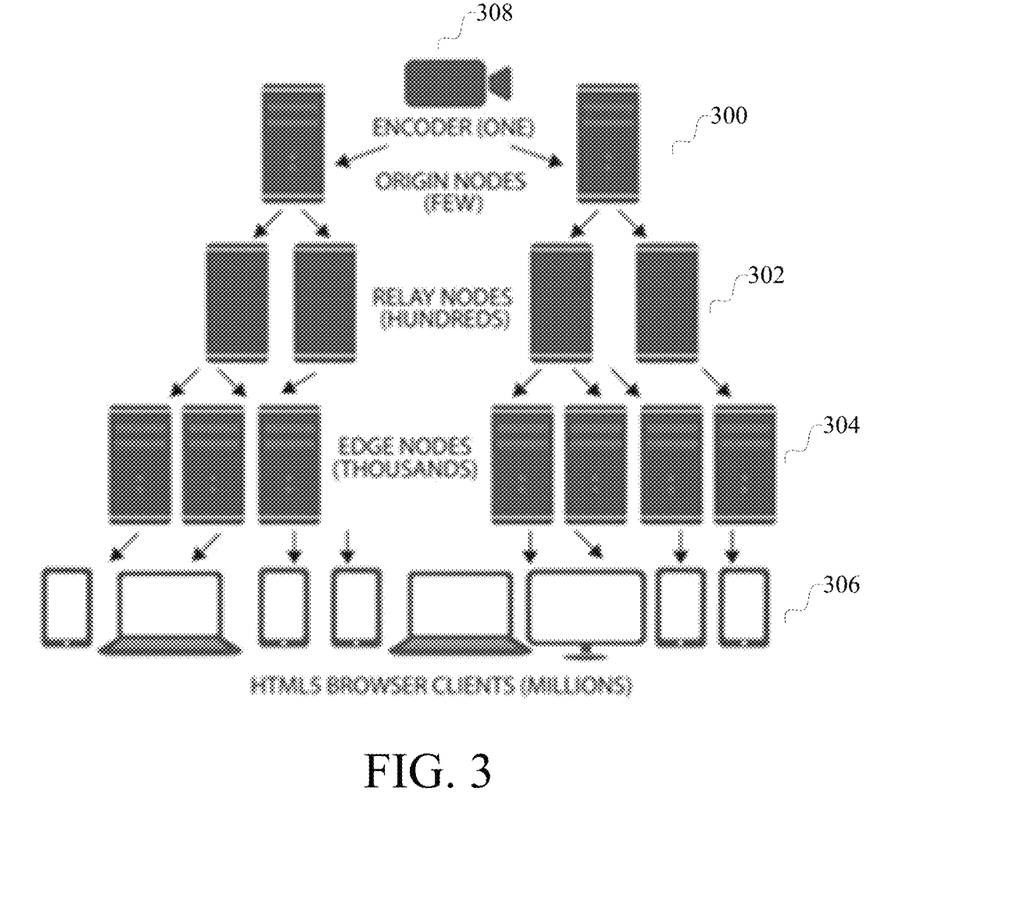
FIG. 3 is a diagram of an example cluster showing how a live stream is delivered from an encoder to HTML5 clients through origins, relays, and edges.

Turning now to FIG. 3, a diagram illustrates a single cluster and how a live stream is delivered through it. For a typical one-to-many broadcast the cluster has a few origins 300, hundreds of relays 302 and thousands of edges 304. In this way, the streams can be delivered to devices 306 for millions of concurrent users. Moreover, as the demand changes the cluster automatically scales to expand or shrink, for example by spinning up new instances or terminating down unused instances of origins, relays, or edges. Spinning up a new instance can take several seconds, and this makes the system vulnerable to a surge in the number of users as it could happen in event based live streams. This system solves this problem by providing a scheduling API that allows to setup a cluster that is already at scale before the start of an event and that is torn down after the event has finished.

Figure 4:
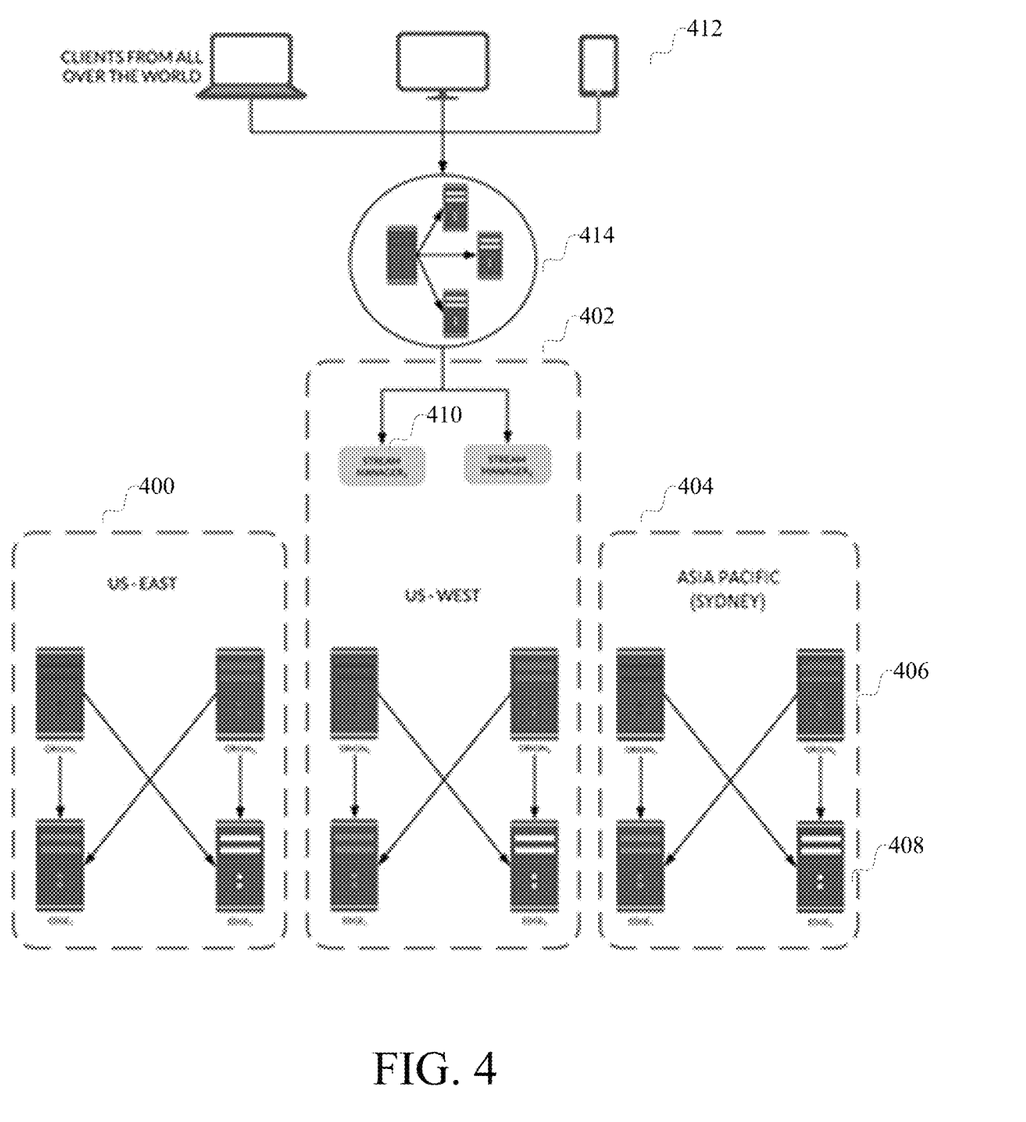
FIG. 4 is a diagram of an example deployment to cover North America and Australia regions with the initial status of the clusters.

An example of a simple deployment diagram is shown in FIG. 4. It includes three clusters (400, 402, 404) to serve users from North America and Australia regions with load balanced stream managers 410 that will be used by the users to subscribe to video streams. The clusters in this example are initialized with two origins 406 and two edges 408 and will spin up new instances as required by demand. As an example for a system that receives video from a satellite or spacecraft, the origins 406 in the clusters in FIG. 4 subscribe to an edge (not shown) on Earth's orbit that is part of the space cluster to receive a live stream and deliver it to the edges 408 to which these origins 406 are connected. When a user subscribes to a video stream, the user's device (e.g., one of 412) makes a request over network 414 to a stream manager 410 which returns to the user's device an identifier of a host of the edge 408 to which it should connect over network 414. After connecting to the identified edge, the subscriber can watch the live stream through the user's device.

Figure 5:
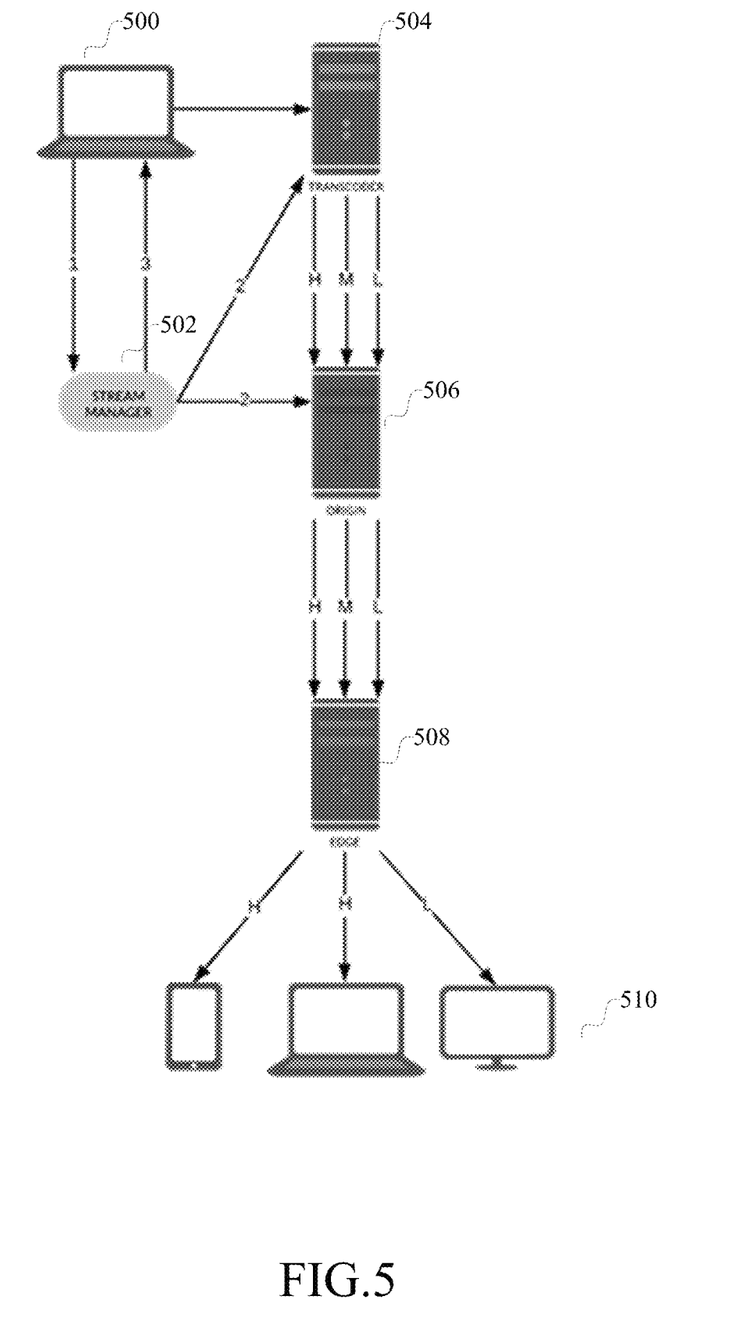
FIG. 5 illustrates ABR Support with a transcoder node.

In some implementations, such a system can implement Adaptive flit Rate (ABR) encoding to deliver to subscribers the best version of a stream given their bandwidth available, e.g., using an encoder 308 as shown in FIG. 3. In some implementations, multiple versions of a stream can be generated through an encoder and supplied directly to a node. In some implementations, as shown in FIG. 5, a single stream can be supplied to a transcoder node (504) which generates multiple variants of the same strewn. The process works as follows. First, a source 500 of the stream requests a provision of a transcoder by sending a request to a stream manager 502. Provisioning data specifies different variants of a stream that will be published. Then, the stream manager API is used to request a transcoder endpoint. The stream manager selects a suitable origin 506 and transcoder 504. The origin 506 is provisioned to expect multiple versions of the same stream, while the transcoder 504 is provisioned with the details of the different stream variants that it creates. The stream manager returns to the source 500 a message, e.g., in the form of a JSON object or other suitable data structure, including data representative of details of the transcoder endpoint that should be used to broadcast. The broadcaster can then start to publish a single stream from the source 500 to the transcoder 504.

In some implementations, the system can live stream content for which access should be restricted to only authorized users. In such a system, various techniques are implemented to reduce the risk of access by unauthorized users.

In some implementations, the system encrypts live streams between nodes. A variety of encryption techniques can be used, including, but not limited to, 256-bit AES-CTR encryption via DTLS and SRTP. DTLS is used to establish and periodically refresh the encryption keys that are then used to encrypt the RTP connection, and thus create an SRTP connection. In implementations with encryption, every connection between nodes in the space cluster are encrypted. Moreover, the connections between edge's orbiting the Earth and origins in the cloud-based cluster on Earth, and the connections between edges in the cloud-based cluster and users of the system are encrypted as well. In some implementations, the internal connections, that is the connections between origins, relays, and edges, in the cloud-based cluster can be unencrypted, as security is provided within the cloud platform where the nodes are deployed.

In implementations using DTLS and SRTP to encrypt connections, the content that is streamed between any two nodes is not accessible to unauthorized users. Servers still have access to an unencrypted stream, thus allowing access to the unencrypted video stream by anyone with control of the server. To reduce the risk of access at a server, in some implementations, a second layer of encryption can be used on top of DTLS and SRTP so that the video streams are delivered encrypted end-to-end. In this way, the servers would not have access to an unencrypted video stream.

In some implementations, round trip authentication (RTA) allows the system to validate every incoming publish or subscribe request against an authentication server. If the request is validated, then the client is allowed to continue with its action of either publishing a stream or subscribing to a published stream.

Figure 6:
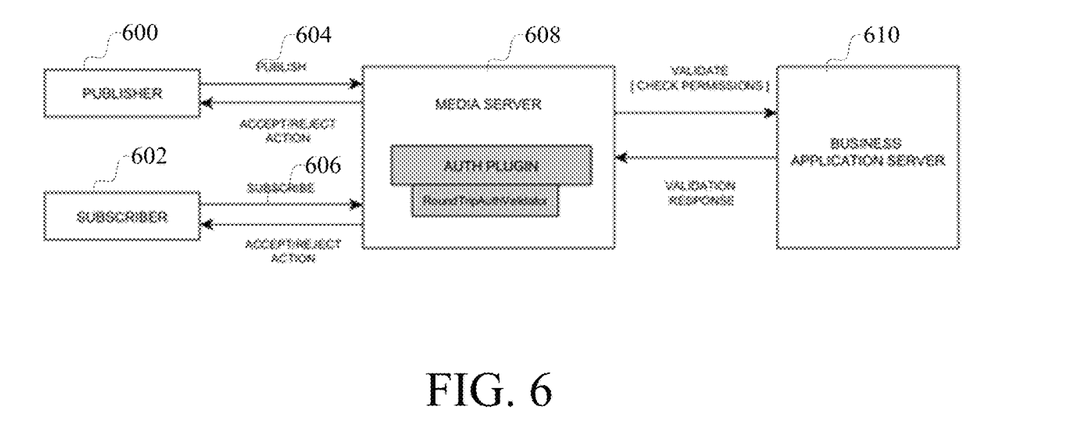
FIG. 6 illustrates round trip authentication which can be used to validate publishing and subscribing clients against an application or authentication server.

A block diagram of an example implementation of RTA is shown in FIG. 6. The process in this example implementation works as follows.

Clients that are allowed to publish or to watch live streams are provided with access credentials, such as a username, password and optionally a token. These access credentials can be managed, for example, by an entity who controls the content. For example, the entity may control a business application server (610 in FIG. 6) which stores and validates access credentials. In some implementations, a decryption key may be provided if the system is configured to use the end-to-end encryption.

A client, e.g., a publisher 600 or subscriber 602, makes a publish request (604) or subscribe request (606) to a media server 608 in the system, providing their access credentials. The media server receives the request from the client and validates the request. For example, in some implementations, the media server 608 can make a call to a REST endpoint on a business application server 610 with the data that it received from the client. The application server 610 validates the data received in the request, to determine if the client has the permissions to continue with its action or not and provides a validation response back to the media server. The media server determines, based on the response from the application server, whether to accept or deny the request (604 or 606) from the client. If the request is accepted, then the client is allowed to either publish or subscribe to a video stream. In case of an end-to-end encrypted stream, the client uses the decryption key it received to decrypt the stream.

In the example implementation shown in FIG. 6, the system can authenticate clients without access to the business rules that determine who is authenticated. Therefore, the cluster that distributes content and the authentication server 610 can be independently controlled and operated from each other, such as by separate entities using separate computer systems. The entity that wishes to control access to the system and the content, for both publishing and subscribing, is able to enforce and update custom authentication rules as needed just by updating the application server.

In some implementations, subscribers can use a standard internet browser to receive live streams using a standard protocol, such as the Web Real-time Communication (WebRTC) protocol or the real-time streaming protocol (RTSP) or the QUIC protocol or others, from an edge node of the cluster. The WebRTC protocol provides a secure connection by using DTLS and SRTP and is supported by the major browsers.

In some implementations, an additional layer of encryption is used to provide end-to-end encryption. In such implementations, the client devices used by the subscribers receive a stream of encrypted packets. The client devices have the corresponding decryption software or hardware, and a decryption key supplied by the entity controlling the content, as described above.

In some implementations, the live streaming system is used to provide video from a set of status cameras and other status sensors on a spacecraft or satellite. For example, status cameras may monitor the status of the external and interior surfaces and systems with the purpose of informing the on-board crew and ground personnel in case of changes. Such cameras typically are mounted in a fixed position, and thus their feeds are mostly still images. As noted above in connection with FIG. 1, an automatic monitoring system can include an image processing system (for the case of status cameras) which can be used to monitor the feeds from status cameras and trigger an alarm when changes are detected. In one example implementation, the image processing is implemented using C++ code with the OpenCV library. Such an implementation is run directly by the system through a program such as a Cauldron server which allows the server to run native C++ code.

Generally, the process implemented for image processing applied to images from a status camera are the following. Similar operations can be performed on other types of sensor data.

For each pair of subsequent frames in a sequence of frames from the status camera, the system computes the difference between the two frames. A thresholding function is applied to convert the difference image into a binary image. Contours of objects in the binary image are then identified. If the contours cover an area that is bigger than a certain threshold, then the system generates an alert. Such an alert can be sent, for example, to crew on the spacecraft, or can be transmitted through the system to ground personnel, or both.

In some implementations, these status cameras and other sensors are connected to an on-demand system that allows viewers to watch or otherwise access the live streams from Earth. Allowing on-demand access, instead of continuous streaming, greatly reduces the amount of bandwidth used by the system while still allowing access to the streams at any time. To further reduce the bandwidth used by status cameras, a transcoder node can be deployed to lower the quality of the video stream before it is delivered to Earth. In this way, it is possible to normally deliver the stream at a reasonably low quality to save bandwidth and avoid congesting the network and increase the quality when the live stream is used to conduct inspections or verify the status of surfaces and equipment.

Figure 7:
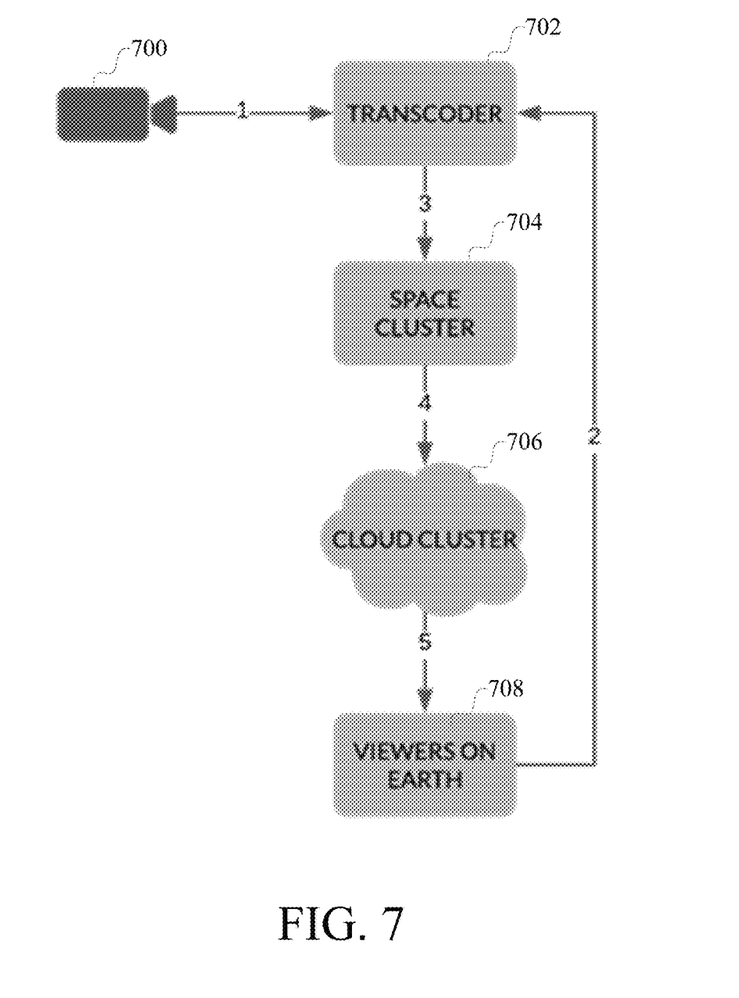
FIG. 7 illustrates use of a transcoder with status cameras.

A diagram of an example implementation of such a system for a single camera is shown in FIG. 7. The camera 700 is interfaced with a transcoder node 702, such as in the manner described above in connection with FIG. 5, to deliver to it the video stream with the highest quality supported. A viewer using a client device 708 from Earth can configure the output quality of the video stream generated by the transcoder 702. The live stream is delivered to an origin 704 in the space-based cluster and then from an edge in the space-based cluster to an origin in the earth-based cluster 706. A viewer on Earth connects a client device 708 to an edge in the earth-based cluster 706 to watch the live stream. In some implementations, this process is set up to work independently from different cameras, thus allowing a viewer to set a different video quality for any different cameras.

It is possible that different users using the system at the same time may request different qualities of the live stream. In some implementations, the transcoder can provide multiple different streams of different qualities as requested. In implementations in which the transcoder provides a limited number of streams, there can be conflicts between users' requests. Conflicts can be prevented by ignoring a quality change request if the change results in the stream quality being set at a level that is lower than a level that is currently being used by another user in the system. In some implementations, after one user stops watching a stream, the transcoder can automatically lower the quality to the highest one set by the remaining users in the system. Conversely, if a new user requests a higher quality setting, then the system can immediately set the transcoder to this higher quality.

In some implementations, stream recording capabilities are enabled on transcoders that receive the status camera feeds. Such recordings ensure that there is always a high definition copy of the live stream that can be retrieved when an alarm is triggered. Such recordings are useful for many purposes, such as analyzing how a problem started and developed before an operator can start watching the live stream. In some implementations, the recording capabilities are extended to include DVR functionalities to allow the operator to search back and forth in a recorded video stream as desired.

Although the examples provided herein reference communication through space, the present disclosure can be implemented within any combination of locations through any combination of mediums. For example, the present disclosure can be implemented terrestrially, over the air, under water, and using any other system in which the sources, origins, relays, or edge nodes are in movement and transmission of data between nodes uses a line of sight.

Figure 9:
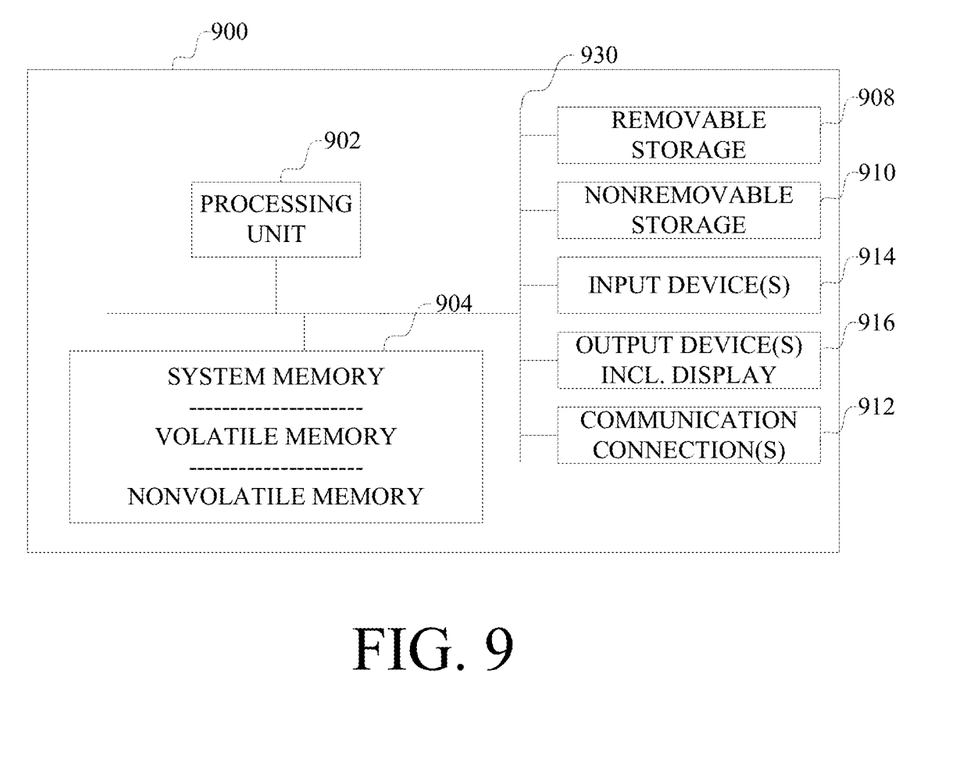
FIG. 9 illustrates a block diagram of a general-purpose computer.

Having now described several example implementations, FIG. 9 illustrates an example of a general purpose computing device with which can be used to implement a node, user's device, client device, edge, relay, origin, stream manager, media server, transcoder, application server, or other computer system as described here, used in connection with providing a space-based cluster or earth-based cloud-based cluster. This is only one example of a computer and is not intended to suggest any limitation as to the scope of use or functionality of such a computer. The system described above can be implemented in one or more computer programs executed on one or more such computers as shown in FIG. 9.

FIG. 9 is a block diagram of a general-purpose computer which processes computer program code using a processing system. Computer programs on a general-purpose computer typically include an operating system and applications. The operating system is a computer program running on the computer that manages and controls access to various resources of the computer by the applications and by the operating system, including controlling execution and scheduling of computer programs. The various resources typically include memory, storage, communication interfaces, input devices, and output devices. Management of such resources by the operating typically includes processing inputs from those resources.

Examples of such general-purpose computers include, but are not limited to, larger computer systems such as server computers, database computers, desktop computers, laptop and notebook computers, as well as mobile or handheld computing devices, such as a tablet computer, hand held computer, smart phone, media player, personal data assistant, audio or video recorder, or wearable computing device.

With reference to FIG. 9, an example computer 900 comprises a processing system including at least one processing unit 902 and a memory 904. The computer can have multiple processing units 902 and multiple devices implementing the memory 904. A processing unit 902 can include one or more processing cores (not shown) that operate independently of each other. Additional co-processing units, such as graphics processing unit 920, also can be present in the computer. The memory 904 may include volatile devices (such as dynamic random access memory (DRAM) or other random access memory device), and non-volatile devices (such as a read-only memory, flash memory, and the like) or some combination of the two, and optionally including any memory available in a processing device. Other memory such as dedicated memory or registers also can reside in a processing unit. This configuration of memory is illustrated in FIG. 9 by dashed line 904. The computer 900 may include additional storage (removable or non-removable) including, but not limited to, magnetically recorded or optically-recorded disks or tape. Such additional storage is illustrated in FIG. 9 by removable storage 908 and non-removable storage 910. The various components in FIG. 9 typically are interconnected by an interconnection mechanism, such as one or more buses 930.

A computer storage medium is any medium in which data can be stored in and retrieved from addressable physical storage locations by the computer. Computer storage media includes volatile and nonvolatile memory devices, and removable and non-removable storage devices. Memory 904, removable storage 908 and non-removable storage 910 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

The computer 900 may also include communications connection(s) 912 that allow the computer to communicate with other devices over a communication medium. Communication media typically transmit computer program code, data structures, program modules or other data over a wired or wireless substance by propagating a modulated data signal such as a carrier wave or other transport mechanism over the substance. As noted above, such communication between spacecraft and satellites or other space-based nodes in the system can be implemented using optical technology, such as lasers that transmit data between two nodes having a line of sight between them. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media include any non-wired communication media that allows propagation of signals, such as acoustic, electromagnetic, electrical, optical, infrared, radio frequency and other signals. Communications connections 912 are devices, such as a network interface or radio transmitter, that interface with the communication media to transmit data over and receive data from signals propagated through communication media.

The communications connections can include one or more radio transmitters for telephonic communications over cellular telephone networks, or a wireless communication interface for wireless connection to a computer network. For example, a cellular connection, a Wi-Fi connection, a Bluetooth connection, and other connections may be present in the computer. Such connections support communication with other devices, such as to support voice or data communications.

The computer 900 may have various input device(s) 914 such as various pointer (whether single pointer or multi-pointer) devices, such as a mouse, tablet and pen, touchpad and other touch-based input devices, stylus, image input devices, such as still and motion cameras, audio input devices, such as a microphone. The computer may have various output device(s) 916 such as a display, speakers, printers, and so on, also may be included. These devices are well known in the art and need not be discussed at length here.

The various storage 910, communication connections 912, output devices 916 and input devices 914 can be integrated within a housing of the computer, or can be connected through various input/output interface devices on the computer, in which case the reference numbers 910, 912, 914 and 916 can indicate either the interface for connection to a device or the device itself as the case may be.

An operating system of the computer typically includes computer programs, commonly called drivers, which manage access to the various storage 910, communication connections 912, output devices 916 and input devices 914. Such access can include managing inputs from and outputs to these devices. In the case of communication connections, the operating system also may include one or more computer programs for implementing communication protocols used to communicate information between computers and devices through the communication connections 912.

Each component (which also may be called a "module" or "engine" or the like), of a computer system and which operates on one or more computers, can be implemented as computer program code processed by the processing system(s) of one or more computers. Computer program code includes computer-executable instructions or computer-interpreted instructions, such as program modules, which instructions are processed by a processing system of a computer. Such instructions define routines, programs, objects, components, data structures, and so on, that, when processed by a processing system, instruct the processing system to perform operations on data or configure the processor or computer to implement various components or data structures in computer storage. A data structure is defined in a computer program and specifies how data is organized in computer storage, such as in a memory device or a storage device, so that the data can accessed, manipulated and stored by a processing system of a computer.

It should be understood that the subject matter defined in the appended claims is not necessarily limited to the specific implementations described above. The specific implementations described above are disclosed as examples only.

What is claimed is:

1. A system for streaming data through space, comprising:
an origin node configured to provide a stream of data;
a plurality of relay nodes;
a plurality of edge nodes;
computer storage having data stored thereon, wherein the data represents physical locations of the origin node, the plurality of relay nodes, and the plurality of edge nodes; and
a stream manager, comprising a server computer accessing the computer storage and including a processing system and computer program instructions that configure the processing system to:
determine a configuration of data transmission for the stream, for a window of time, from the origin node to one or more of the plurality of edge nodes, wherein the configuration includes data indicating, for the window of time, pairs of nodes that are instructed to communicate with each other during the window of time, based on at least lines of sight between nodes during the window of time, based on the physical locations in three dimensions of the origin node, the plurality of relay nodes, and the plurality of edge nodes, and
instruct the pairs of nodes to communicate with each other during the window of time;
wherein each relay node in one of the pairs of nodes in the configuration for the window of time is configured, during the window of time, to receive the stream of data from a respective first node, from among the origin node or the plurality of relay nodes according to the configuration, and to transmit the stream of data to a respective second node, from among the plurality of relay nodes or the plurality of edge nodes according to the configuration; and
wherein the origin node transmits the stream of data to a relay node, according to the configuration for the window of time, by communicating optically with the relay node when sharing a line of sight with the relay node;

wherein each relay node in one of the pairs of nodes in the configuration for the window of time transmits the stream of data to the respective second node by communicating optically with the respective second node when sharing a line of sight with the respective second node.

2. The system of claim 1, wherein communicating optically comprises communicating using laser communication.

3. The system of claim 1, wherein the stream manager is configured to switch from a first configuration for a first window of time to a second configuration for a second window of time in response to interruption of a line of sight between two nodes of a pair of nodes in the first configuration.

4. The system of claim 3, further comprising a database of physical locations in three dimensions of obstacles affecting line of sight between nodes, wherein the configuration for a window of time is further based on the physical locations of the obstacles.

5. The system of claim 4, wherein the obstacles comprise space debris.

6. The system of claim 1, wherein at least one node from among the origin node, the plurality of relay nodes, and the plurality of edge nodes further comprises a transcoder node providing at least a first version of the stream of data having a first quality and a second version of the stream of data having a second quality different from the first quality.

7. The system of claim 6, wherein the first version has a first bandwidth utilization and the second version has a second bandwidth utilization different from the first bandwidth utilization.

8. The system of claim 1, further comprising:
one or more data links connected to transmit the stream of data from at least one of the plurality of edge nodes; and
a cluster of computers connected to the one or more data links to receive the stream of data from the one or more data links and to deliver the stream of data received from at least one of the plurality of edge nodes to at least one subscriber computer.

9. The system of claim 1, wherein an origin node comprises:
a spacecraft or a satellite;
an optical communication device;
a server computer installed on the spacecraft or satellite to manage streaming the stream of data over the optical communication device.

10. The system of claim 1, wherein a relay node comprises:
a spacecraft or a satellite;
an optical communication device;
a server computer installed on the spacecraft or satellite to manage streaming the stream of data over the optical communication device.

11. The system of claim 1, wherein an edge node comprises:
a spacecraft or a satellite;
an optical communication device;
a data link to a terrestrial computer cluster; and
a server computer installed on the spacecraft or satellite to manage receiving the stream of data over the optical communication device and to manage streaming the stream of data over the data link to the terrestrial computer cluster.

12. The system of claim 11, wherein the edge node comprises a satellite in geostationary orbit.

13. The system of claim 1, further comprising a plurality of origin nodes, each providing a respective distinct stream of data for transmission.

14. A method for streaming data through space using a system including an origin node configured to provide a stream of data, a plurality of relay nodes, and a plurality of edge nodes, configured by stream manager having access to data representing the physical locations of the origin node, the plurality of relay nodes, and the plurality of edge nodes, the method comprising:
the stream manager determining a configuration of data transmission for the stream, for a window of time, from the origin node to one or more of the plurality of edge nodes, wherein the configuration includes data indicating, for the window of time, pairs of nodes that are instructed to communicate with each other during the window of time, based on at least lines of sight between nodes during the window of time, based on the physical locations in three dimensions of the origin node, the plurality of relay nodes, and the plurality of edge nodes; and
the stream manager instructing the pairs of nodes to communicate with each other during the window of time;
the origin node transmitting the stream of data to a relay node, according to the configuration for the window of time, by communicating optically with the relay node when sharing a line of sight with the relay node; and
each relay node in one of the pairs of nodes in the configuration for the window of time, during the window of time, receiving the stream of data from a respective first node, from among the origin node or the plurality of relay nodes according to the configuration, and transmitting the stream of data to a respective second node, from among the plurality of relay nodes or the plurality of edge nodes according to the configuration, wherein the relay node transmits the stream of data to the respective second node by communicating optically with the second node when sharing a line of sight with the second node.

15. The method of claim 14, further comprising switching from a first configuration for a first window of time to a second configuration for a second window of time in response to interruption of a line of sight between two nodes of a pair of nodes in the first configuration.

16. The method of claim 15, wherein the system further includes one or more data links connecting one or more edge nodes of the plurality of edge nodes to a cluster of computers, the method further comprising:
edge nodes in the configuration transmitting the stream of data to the cluster of computers over the one or more data links; and
the cluster of computers receiving the stream of data over the one or more data links and delivering the stream of data to at least one subscriber computer.

17. The method of claim 15, wherein the origin node comprises:
a spacecraft or a satellite;
an optical communication device;
a server computer installed on the spacecraft or satellite to manage streaming the stream of data over the optical communication device.

18. The method of claim 17, wherein each relay node of the plurality of relay nodes comprises:
- a spacecraft or a satellite;
- an optical communication device;
- a server computer installed on the spacecraft or satellite to manage streaming the stream of data over the optical communication device.

19. The method of claim 18, wherein each edge node of the plurality of edge nodes comprises:
- a spacecraft or a satellite;
- an optical communication device;
- a data link to a terrestrial computer cluster; and
- a server computer installed on the spacecraft or satellite to manage receiving the stream of data over the optical communication device and to manage streaming the stream of data over the data link to the terrestrial computer cluster.

20. The method of claim 15, wherein the system further includes a database of physical locations in three dimensions of obstacles affecting line of sight between nodes, and wherein the stream manager determines the configuration for a window of time further based on the physical locations of the obstacles.

\* \* \* \* \*